US012151743B2

United States Patent
Ishii (10) Patent No.: US 12,151,743 B2
(45) Date of Patent: Nov. 26, 2024

(54) WORK VEHICLE

(71) Applicant: Kubota Corporation, Osaka (JP)

(72) Inventor: Yuji Ishii, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/121,867

(22) Filed: Mar. 15, 2023

(65) Prior Publication Data

US 2023/0322304 A1   Oct. 12, 2023

(30) Foreign Application Priority Data

Mar. 16, 2022   (JP) .................. 2022-041646

(51) Int. Cl.
*B62D 21/18*   (2006.01)
*B62D 25/08*   (2006.01)

(52) U.S. Cl.
CPC ......... *B62D 21/183* (2013.01); *B62D 25/088* (2013.01)

(58) Field of Classification Search
CPC .. B62D 21/183; B62D 21/152; B62D 21/155; B62D 25/08; B62D 21/12
See application file for complete search history.

(56) References Cited

U.S. PATENT DOCUMENTS

| | | | | |
|---|---|---|---|---|
| 2004/0195797 A1* | 10/2004 | Nash | ........................ | B60G 7/02 280/124.136 |
| 2013/0048409 A1* | 2/2013 | Fujii | ...................... | B60K 17/06 180/364 |
| 2014/0035259 A1* | 2/2014 | Koren | ..................... | B62D 21/11 280/638 |
| 2014/0224564 A1* | 8/2014 | Maeda | ................. | B62D 21/183 180/291 |
| 2014/0345964 A1* | 11/2014 | Nakaoka | ................... | B60G 3/20 180/291 |
| 2017/0001519 A1* | 1/2017 | Bessho | ...................... | F01N 3/10 |
| 2017/0001549 A1* | 1/2017 | Bessho | ................... | B60L 53/80 |
| 2017/0246942 A1* | 8/2017 | Takaki | ..................... | B60K 1/04 |
| 2017/0368898 A1* | 12/2017 | White | ...................... | B60G 3/20 |
| 2018/0154765 A1* | 6/2018 | Oyama | ............... | F01N 13/1822 |
| 2021/0031713 A1* | 2/2021 | Kotrla | ...................... | B60G 3/20 |

FOREIGN PATENT DOCUMENTS

| | | | | |
|---|---|---|---|---|
| BE | 1010650 A3 * | 11/1998 | ............... | B60G 3/18 |
| JP | 201959372 A | 4/2019 | | |

* cited by examiner

*Primary Examiner* — Paul N Dickson
*Assistant Examiner* — Matthew D Lee
(74) *Attorney, Agent, or Firm* — The Webb Law Firm (57) ABSTRACT

A work vehicle includes a lower frame 15, support frames 21 joined to left and right portions of the lower frame 15 and extending upward, suspension arms 25 and 26 supported by the support frames 21, and uprights supported by the suspension arms 25 and 26 and supporting wheels. The work vehicle also includes suspension springs 31 connected to the suspension arms 25 and 26 and the support frames 21, and dampers 32 connected to the suspension arms 25 and 26 and the support frames 21. The lower frame 15 is joined to a body frame.

7 Claims, 7 Drawing Sheets

// WORK VEHICLE

CROSS REFERENCE TO RELATED APPLICATION

This application claims priority to Japanese Patent Application No. 2022-041646 filed on Mar. 16, 2022, the disclosure of which is hereby incorporated by reference in its entirety.

BACKGROUND OF THE INVENTION

Field of the Invention

The present invention relates to a suspension structure of a work vehicle.

Description of the Related Art

JP 2019-59372A discloses an example of a suspension structure of a work vehicle that includes a suspension arm, a suspension spring, a damper, and so on. In JP 2019-59372A, a lower frame that supports a transmission case is joined to a rear portion of a body frame. The lower frame supports the suspension arm, and the suspension spring and the damper are connected to the suspension arm and the body frame.

In an assembly step in JP 2019-59372A, the suspension arm is supported by the lower frame, and a lower portion of the suspension spring and a lower portion of the damper are connected to the suspension arm. Next, it is conceivable that the lower frame is joined to the body frame, and an upper portion of the suspension spring and an upper portion of the damper are connected to the body frame.

In another work step, the suspension arm is supported by the lower frame, and the lower frame is joined to the body frame. Next, it is conceivable that the lower portion of the suspension spring and the lower portion of the damper are connected to the suspension arm, and the upper portion of the suspension spring and the upper portion of the damper are connected to the body frame.

The positional relationship between the suspension arm, the suspension spring, and the damper in a work vehicle needs to be highly accurate from the viewpoint of stable traveling. If, in JP 2019-59372A, the joint position between the lower frame and the body frame slightly shifts from a predetermined joint position while the lower frame is joined to the body frame, and the positional relationship between the lower frame and the body frame becomes less accurate, the positional relationship between the suspension arm, the suspension spring, and the damper becomes less accurate accordingly. Thus, there is room for improvement.

SUMMARY OF THE INVENTION

The present invention aims to improve the accuracy of the positional relationship between a suspension arm, a suspension spring, and a damper in the case where a lower frame is joined to a body frame in a work vehicle.

A work vehicle of the present invention includes: a lower frame; left and right support frames joined respectively to a right portion and a left portion of the lower frame and extending upward; left and right suspension arms supported by the support frame; uprights supporting wheels and supported by the suspension arms; left and right suspension springs connected to the suspension arms and the support frames; and left and right dampers connected to the suspension arms and the support frames, wherein the lower frame is joined to a body frame.

According to the present invention, the support frames are joined to the lower frame and support the suspension arms, and the suspension springs and the dampers are connected to the suspension arms and the support frames. With this, a unit of the lower frame and the support frames supports the suspension arms, the suspension springs, and the dampers, thus enabling the positional relationship between the suspension arms, the suspension springs, and the dampers to be accurately set in the unit of the lower frame and the support frames.

According to the present invention, the positional relationship between the suspension arms, the suspension springs, and the dampers can be maintained accurately by joining the lower frame (support frames, suspension arms, suspension springs, and dampers) assembled as above to the body frame. This enables the positional relationship between the suspension arms, the suspension springs, and the dampers to be accurately set and allows more stable traveling of the work vehicle with the configuration where the lower frame is joined to the body frame.

According to the present invention, productivity can be improved by handling the lower frame, the support frames, the suspension arms, the suspension springs, and the dampers as a unit.

In the present invention, it is preferable that the support frames each have an upper portion joined to a lateral frame of the body frame, the lateral frame extending in a left right direction.

According to the present invention, the lower portions of the support frames are joined to the lower frame, and the upper portions of the support frames are joined to the body frame (lateral frame) by joining the upper portions of the support frames to the lateral frame of the body frame. This can increase the support rigidity of the support frames. Increased support rigidity of the support frames is advantageous in terms of increased accuracy of the positional relationship between the suspension arms, the suspension springs, and the dampers, and is advantageous in terms of more stable traveling of the work vehicle.

In the present invention, it is preferable that the upper portions of the support frames each have a joint joined to the lateral frame, and the suspension springs and the dampers are connected to the joints.

According to the present invention, the joints for joining the support frames to the lateral frame of the body frame are provided in the upper portions of the support frames, and the suspension springs and the dampers are connected to the joints. The joints of the support frames are joined to the lateral frame of the body frame, and then, the lateral frame of the body frame also supports the suspension springs and the dampers.

With this, the joints of the support frames and the lateral frame of the body frame support the load applied from the suspension arms to the suspension springs and the dampers, thus increasing the support rigidity of the suspension springs and the dampers. Increased support rigidity of the suspension springs and the dampers is advantageous in terms of increased accuracy of the positional relationship between the suspension arms, the suspension springs, and the dampers, and is advantageous in terms of more stable traveling of the work vehicle.

In the present invention, it is preferable that the support frames each include: a front section supporting a front portion of a corresponding suspension arm, of the suspension arms; a rear section supporting a rear portion of the corresponding suspension arm, of the suspension arms; and a front-back section joined to the front section and the rear section, and the support frames include connecting areas in which the suspension springs and the dampers are connected to the support frames, the connecting areas being above the front-back sections of the support frames.

According to the present invention, each support frame includes a front section supporting the front portion of the corresponding suspension arm and a rear section supporting the rear portion of the suspension arm, and a front-back section is connected to the front section and the rear section. A connecting area in which the corresponding suspension spring and damper are connected to the support frame is located at a portion of the support frame above the upper section thereof, and the front-back section of the support frame is located in an intermediate section, in the up-down direction, of the support frame.

This can increase the rigidity of the front section and the rear section of each support frame, and increase the rigidity of the entire support frame. Increased rigidity of the front and rear sections of each support frame and increased rigidity of the entire support frame is advantageous in terms of increased accuracy of the positional relationship between the suspension arms, the suspension springs, the dampers, and is advantageous in terms of more stable traveling of the work vehicle.

In the present invention, it is preferable that the work vehicle further includes a transmission case supported by the lower frame; and left and right drive shafts supported by the uprights and extending leftward and rightward, respectively, from the transmission case through regions surrounded by the lower frame, the front sections, the rear sections, and the front-back sections, wherein the transmission case includes a transmission mechanism configured to receive motive power and transfer the motive power to the wheels via the drive shafts.

According to the present invention, the transmission case and the drive shafts are provided to drive the wheels, and the drive shafts extend leftward and rightward through the regions surrounded by the lower frame and the front sections, the rear sections, and the front-back sections of the support frames, and are supported by the uprights. The drive shafts can thus be installed compactly with effective use of the regions formed by the lower frame and the front sections, the rear sections, and the front-back sections of the support frames.

In the present invention, it is preferable that the suspension arms include upper arms and lower arms, and each of the upper arms has a front portion and a rear portion, and (i) the front portion is bent to protrude forward or (ii) the rear portion is bent to protrude rearward, in such a manner that a corresponding one of the left and right suspension springs and a corresponding one of the left and right dampers extend through a region between the front portion and the rear portion at a position forward or rearward of a corresponding one of the left and right drive shafts, and are connected to a corresponding one of the lower arms.

According to the present invention, the suspension arms include the upper arms and the lower arms, and the suspension springs and the dampers are connected to the lower arms and located at lower positions. This is advantageous in terms of positioning the center of gravity of the work vehicle at a lower position.

According to the present invention, the suspension springs and the dampers extend through a region between the front portions and the rear portions of the upper arms and forward (rearward) of the drive shafts, and are connected to the lower arms. In the configuration where the suspension springs and the dampers extend forward of the drive shafts, the front portions of the upper arms are bent and protrude forward, and the suspension springs and the dampers are easily positioned between the drive shafts and the front portions of the upper arms in a plan view. In the configuration where the suspension springs and the dampers extend rearward of the drive shafts, the rear portions of the upper arms are bent and protrude rearward, and the suspension springs and the dampers are easily positioned between the drive shafts and the rear portions of the upper arms in a plan view.

In the present invention, it is preferable that the support frames are joined to a rear portion of the lower frame, the lower frame has a front portion joined to a rear lower portion of the body frame, and the support frames each have an upper portion joined to a lateral frame of the body frame, the lateral frame extending in a left right direction.

According to the present invention, the support frames are joined to rear portions of the lower frame in the configuration where the lower frame (support frames, suspension arms, suspension springs, and dampers) is joined to the body frame. The support frames can thus be easily joined to the rear portions of the body frame due to the front portion of the lower frame being joined to the rear lower portion of the body frame, and the upper portions of the support frames being joined to the lateral frame of the body frame that extends in the left-right direction.

DESCRIPTION OF THE INVENTION

FIGS. 1 to 9 show a multipurpose vehicle. In FIGS. 1 to 9, F indicates a forward direction, B indicates a backward direction, U indicates an upward direction, D indicates a downward direction, R indicates a rightward direction, and L indicates a leftward direction.

Overall Configuration of Work Vehicle

Figure 1:
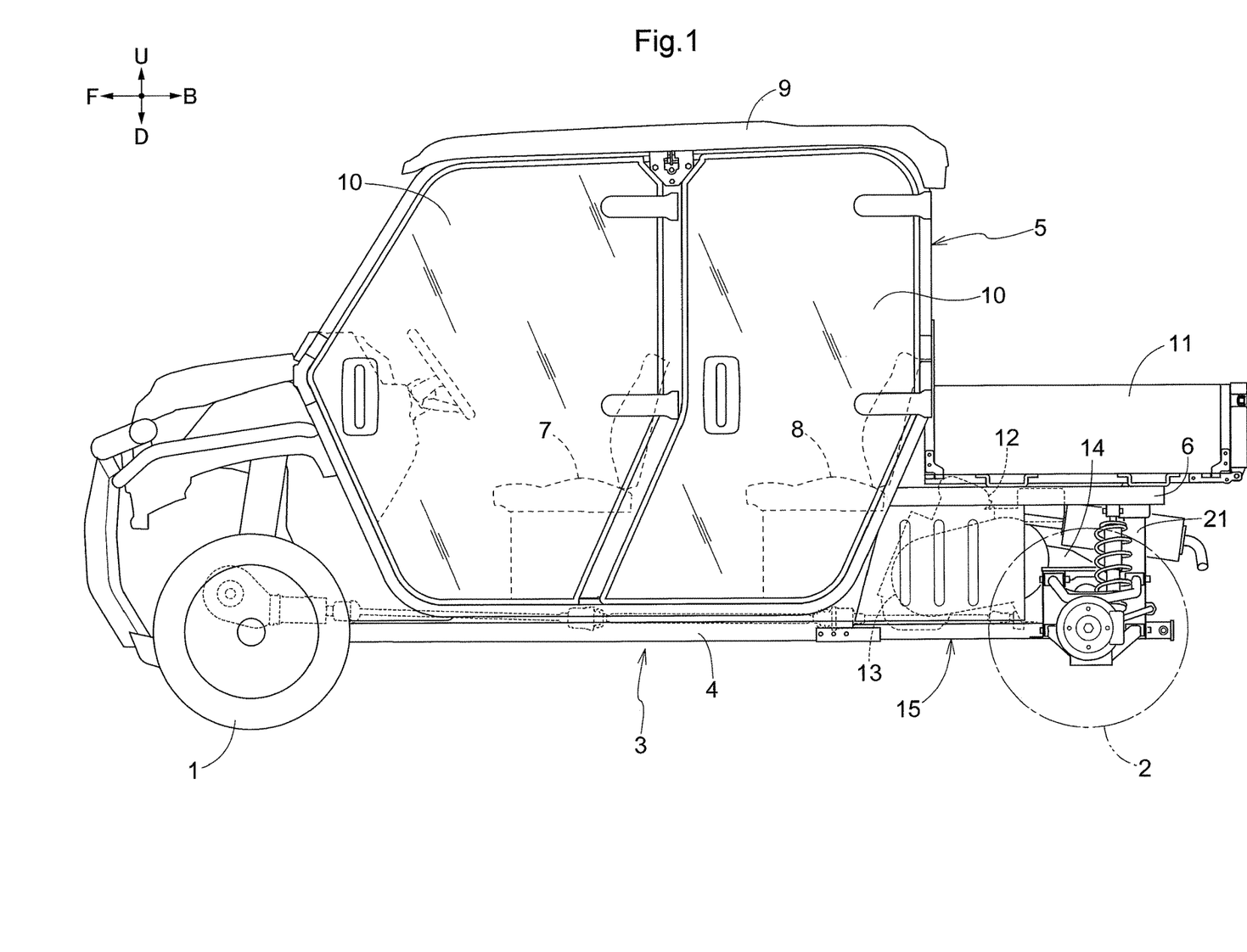
FIG. 1 is a left side view of a work vehicle.
Figure 2:
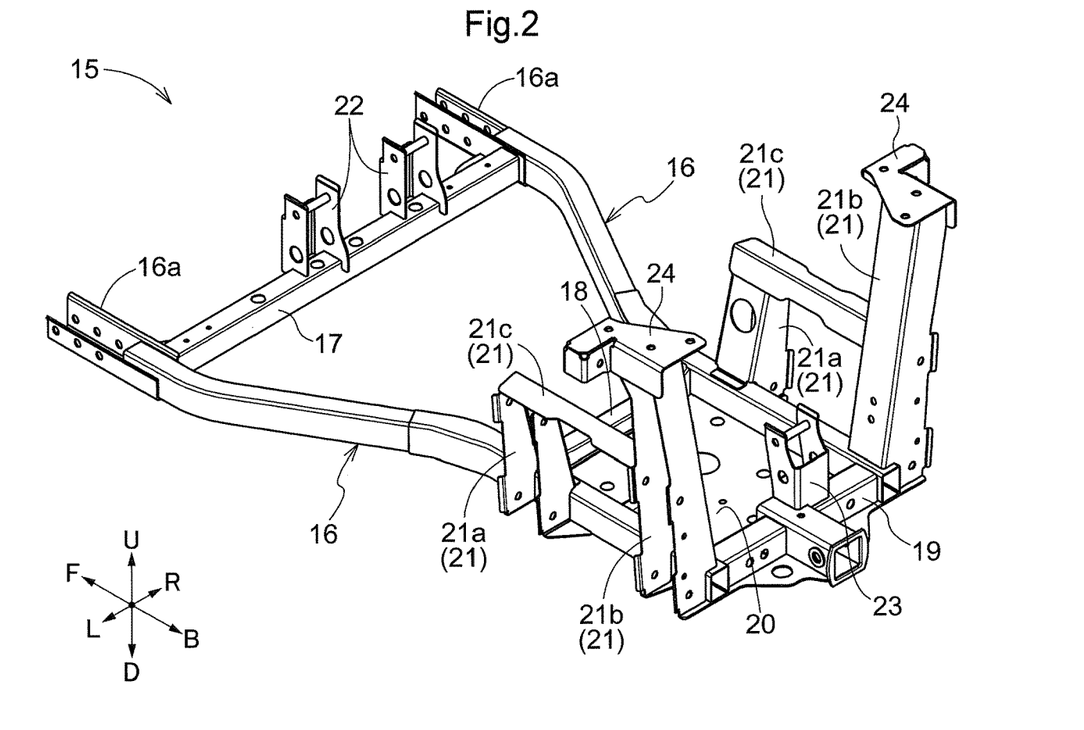
FIG. 2 is a perspective view of a lower frame and support frames.
Figure 3:
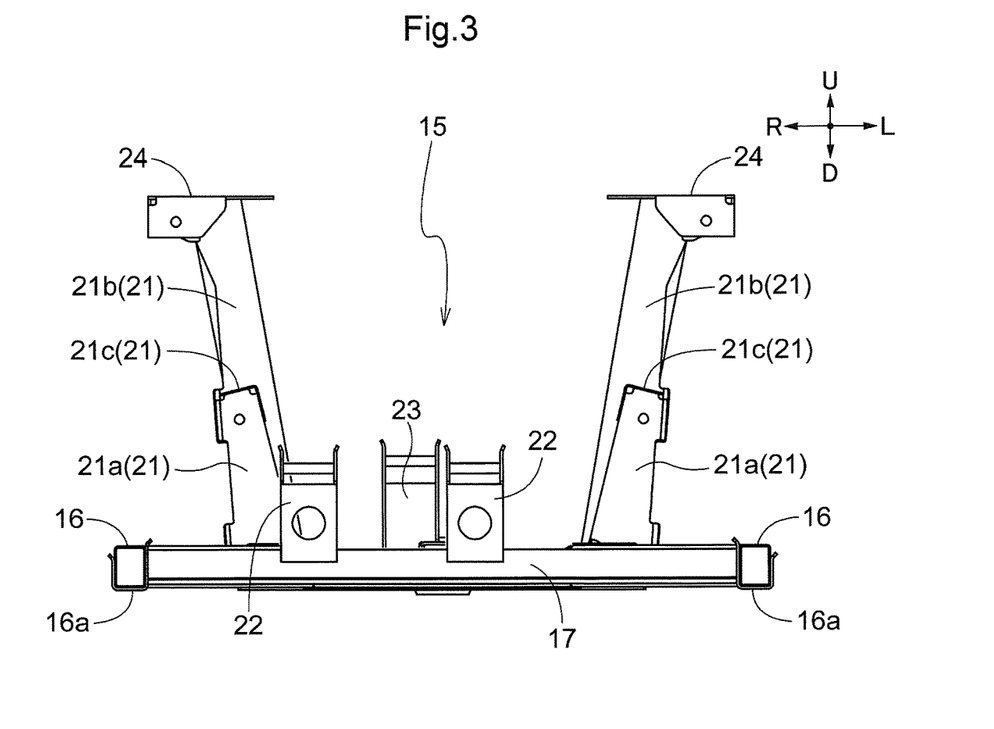
FIG. 3 is a front view of the lower frame and the support frames.
Figure 4:
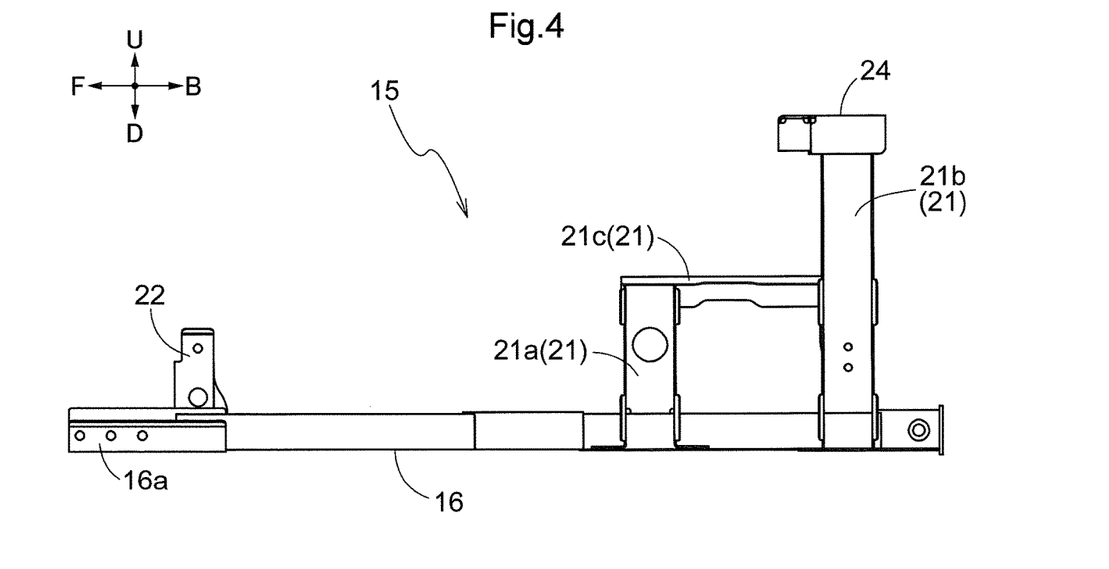
FIG. 4 is a left side view of the lower frame and the support frames.
Figure 5:
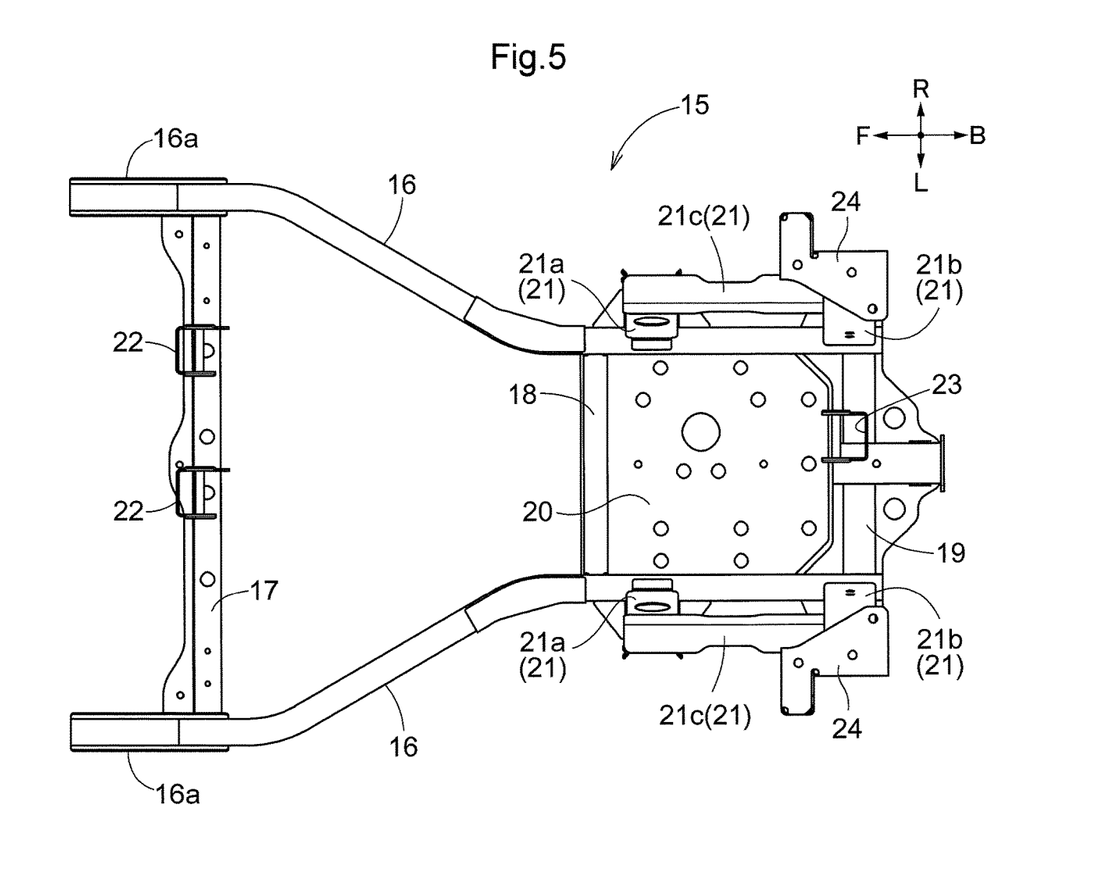
FIG. 5 is a plan view of the lower frame and the support frames.

Left and right front wheels 1 (which correspond to wheels) and left and right rear wheels 2 (which correspond to wheels) support a body frame 3, as shown in FIG. 1. The body frame 3 has a floor frame 4, a ROPS frame 5, a rear frame 6, and other members. The rear frame 6 is joined to a rear portion of the ROPS frame 5, extends backward, and supports a carrier 11.

Left and right front seats 7 and left and right rear seats 8 are provided on the floor frame 4. The ROPS frame 5 is joined to the floor frame 4 and covers the front seats 7 and the rear seats 8. A front windshield (not shown) and a rear windshield (not shown) are provided in a front portion and a rear portion, respectively, of the ROPS frame 5. A roof 9 is provided in an upper portion of the ROPS frame 5. Doors 10 are provided in front and rear portions of the ROPS frame 5.

A lower frame 15 supports an engine 12, a continuously variable transmission 13, a transmission case 14, and the rear wheels 2, and is joined to the floor frame 4 and the rear frame 6.

Configuration of Lower Frame

The lower frame 15 has left and right front-back frames 16, lateral frames 17, 18, and 19, an underpanel 20, left and right support frames 21, attaching sections 22 and 23, joints 24, and so on, as shown in FIGS. 2 to 5.

The front-back frames 16 each have a crank shape in a plan view, and joints 16a are joined to front portions of the front-back frames 16. The lateral frame 17 is joined to the front portions of the front-back frames 16, and the attaching sections 22 are joined to the lateral frame 17.

The lateral frames 18 and 19 are joined to the rear portions of the front-back frames 16. The underpanel 20 is joined to the rear portions of the front-back frames 16 and the lateral frames 18 and 19. The attaching section 23 is joined to the lateral frame 19.

The support frames 21 are joined to the rear portions of the front-back frames 16 in the vicinity of the lateral frames 18 and 19, and extend upward. The left and right support frames 21 are thus joined to left and right rear portions, respectively, of the lower frame 15, and extend upward.

Each of the support frame 21 has a front section 21a, a rear section 21b, and a front-back section 21c. The front section 21a of each support frame 21 is joined to a rear portion of the corresponding front-back frame 16 in the vicinity of the lateral frame 18, and extends upward. The rear section 21b of each support frame 21 is joined to a rear portion of the corresponding front-back frame 16 in the vicinity of the lateral frame 19, and extends upward.

The front-back section 21c of each support frame 21 is joined to an upper portion of the front section 21a of the support frame 21 and an intermediate portion, in the up-down direction, of the rear section 21b. The joints 24 are joined to upper portions of the rear sections 21b of the support frames 21, and are located above the support frames 21.

Figure 6:
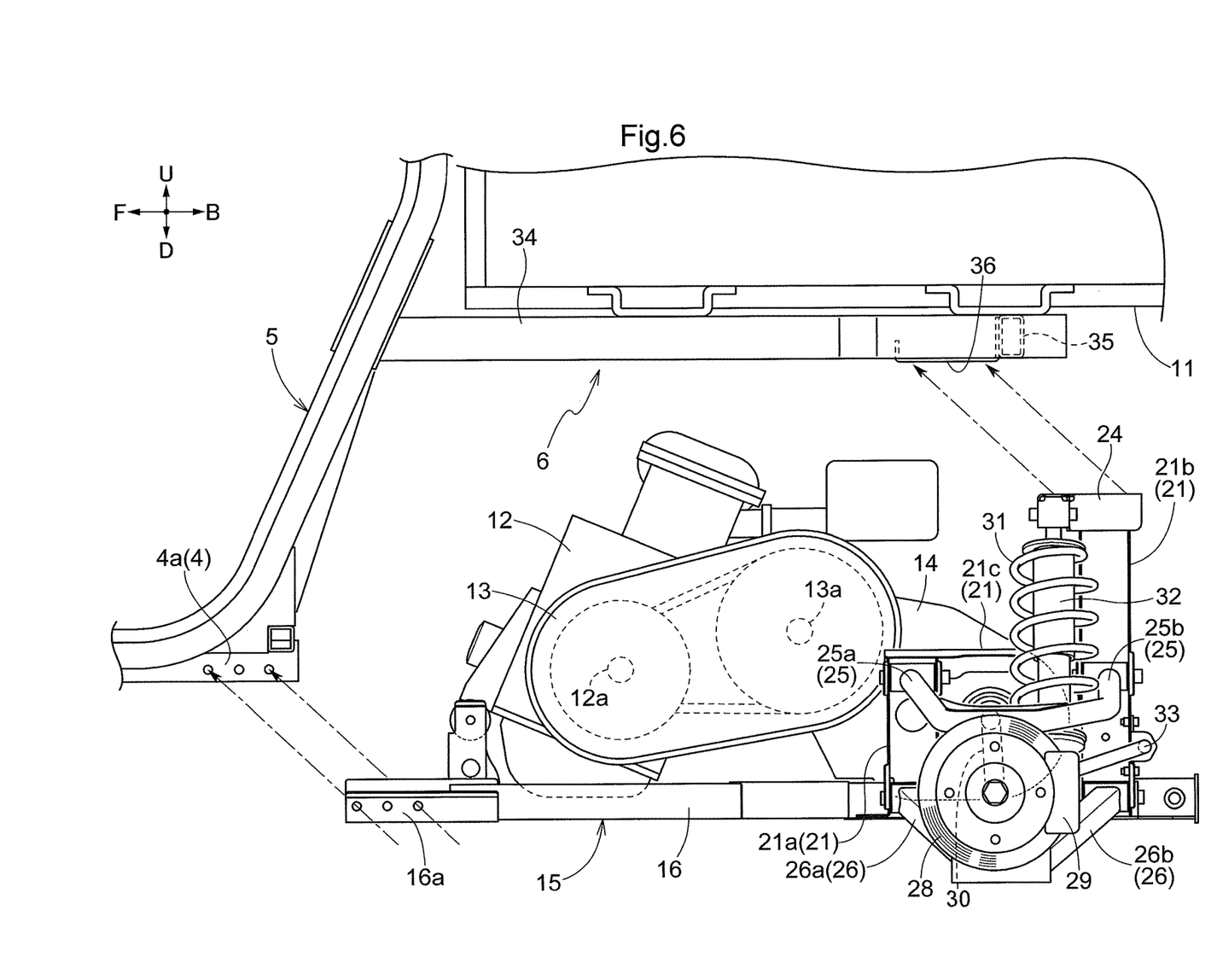
FIG. 6 is a left side view of a rear portion of a body frame, the lower frame, and the support frames with an engine, a continuously variable transmission, a transmission case, a suspension structure, and other members being supported by the lower frame and the support frames.
Figure 7:
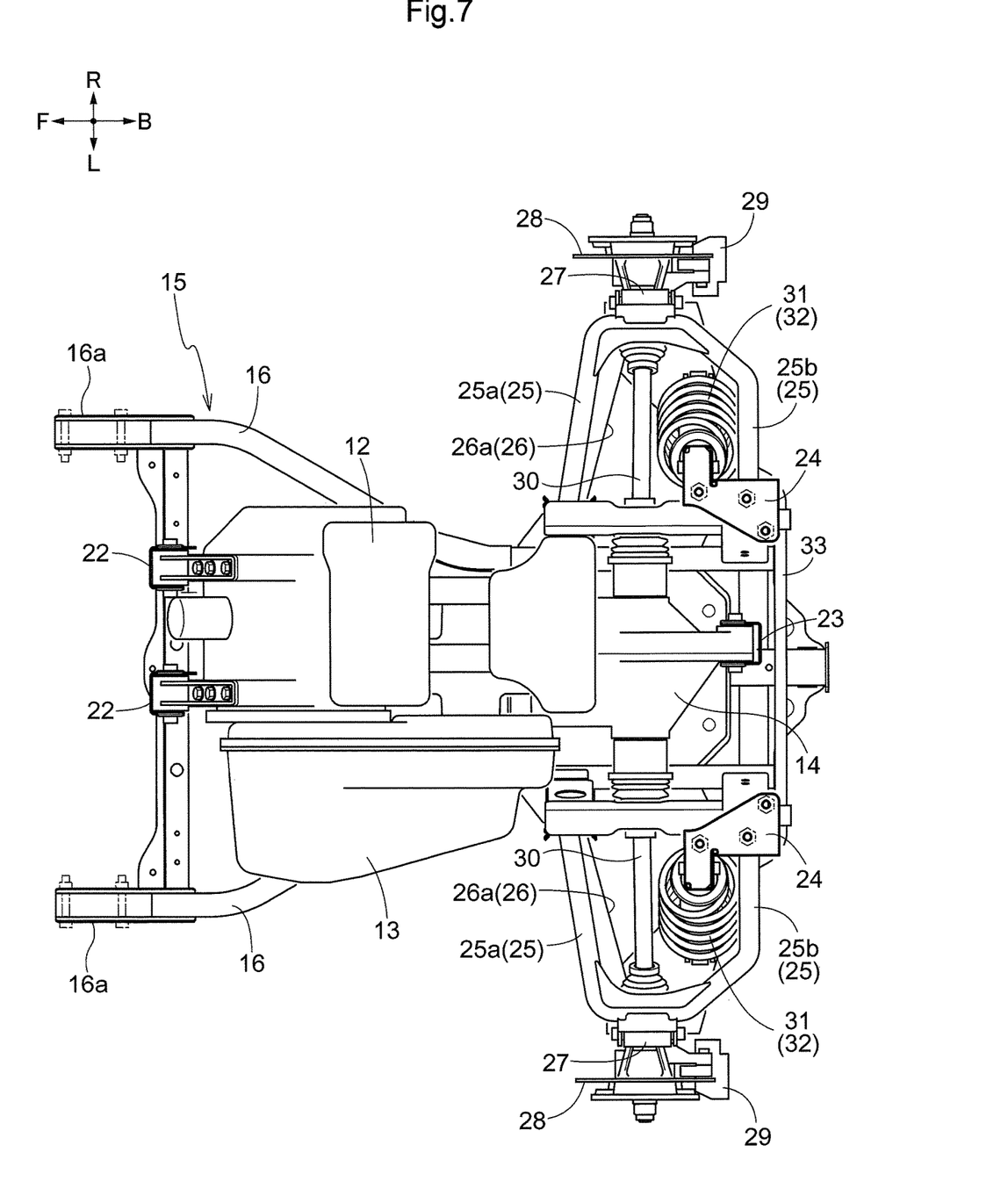
FIG. 7 is a plan view of the lower frame and the support frames with the engine, the continuously variable transmission, the transmission case, the suspension structure, and other members being supported by the lower frame and the support frames.

Support Structure for Engine, Continuously Variable Transmission, and Transmission Case on Lower Frame The engine 12 is laterally oriented along the left-right direction, the transmission case 14 extends in the front-back direction, and a front portion of the engine 12 is joined to a front portion of the transmission case 14 by a joint member (not shown), as shown in FIGS. 6 and 7.

The continuously variable transmission 13 is attached to an output shaft 12a at a left portion of the engine 12 and an input shaft 13a at a front left portion of the transmission case 14. The engine 12, the continuously variable transmission 13, and the transmission case 14 are thus configured as a single unit.

The lower frame 15 supports the engine 12, the continuously variable transmission 13, and the transmission case 14 due to the front portion of the engine 12 being attached to the attaching sections 22 and a rear portion of the transmission case 14 being attached to the attaching section 23.

The continuously variable transmission 13 is of a belt stepless speed change type. The transmission case 14 contains an auxiliary transmission (not shown) (which corresponds to a transmission mechanism) capable of changing speed to three forward gears and one backward gear, and a rear-wheel differential device (not shown) (which corresponds to a transmission mechanism).

Support Structure for Rear Wheels on Lower Frame

Left and right upper arms 25 (which corresponds to suspension arms) and left and right lower arms 26 (which correspond to suspension arms) are provided, as shown in FIGS. 6 to 9.

The upper portions of the front sections 21a of the support frames 21 support front portions 25a of the upper arms 25 in such a manner that the front portions 25a are swingable in the up-down direction. The intermediate portions, in the up-down direction, of the rear sections 21b of the support frames 21 support rear portions 25b of the upper arms 25 in such a manner that the rear portions 25b are swingable in the up-down direction.

Lower portions of the front sections 21a of the support frames 21 support front portions 26a of the lower arms 26 in such a manner that the front portions 26a are swingable in the up-down direction, and lower portions of the rear sections 21b of the support frames 21 support rear portions 26b of the lower arms 26 in such a manner that the rear portions 26b are swingable in the up-down direction.

Ends of the upper arms 25 and ends the lower arms 26 support uprights 27, which support the rear wheels 2. Brake discs 28, which rotate in conjunction with the rear wheels 2, and calipers 29 joined to the uprights 27 are provided and constitute disc brakes.

Left and right drive shafts 30 are provided in an area of the rear-wheel differential device in the transmission case 14. The drive shafts 30 extend leftward and rightward through regions surrounded by rear portions of the front-back frames 16 (lower frame 15) and the front sections 21a, the rear sections 21b, and the front-back sections 21c of the support frames 21. The drive shafts 30 are supported by the uprights 27 and connected to the rear wheels 2.

With the above configuration, motive power of the engine 12 is subjected to speed change by the continuously variable transmission 13, transferred to the auxiliary transmission in the transmission case 14 and subjected to speed change, and is transferred to the rear-wheel differential device. Motive power transferred to the rear-wheel differential device is transferred to the rear wheels 2 via the drive shafts 30, and motive power branching from between the auxiliary transmission and the rear-wheel differential device is transferred to the front wheels 1 via transmission shafts (not shown).

Support Structure for Suspension Springs and Dampers on Lower Frame

Left and right suspension springs 31 and left and right dampers 32 are provided, as shown in FIGS. 6 to 9. One end of each suspension spring 31 is connected to a rod of the corresponding damper 32 in such a manner that the suspension spring 31 and the damper 32 integrally expands and contracts. The other end of each suspension spring 31 is connected to a tube of the corresponding damper 32. The dampers 32 are located inside the suspension springs 31.

Upper portions of the suspension springs 31 and upper portions of the dampers 32 are connected to the joints 24, and lower portions of the suspension springs 31 and lower portions of the dampers 32 are connected to the rear portions 26b of the lower arms 26.

The rear portions 25b of the upper arms 25 are bent and protrude backward. With this, each suspension spring 31 and the corresponding damper 32 extend through a region between the front portion 25a and the rear portion 25b of the corresponding upper arm 25 and rearward of the corresponding drive shaft 30 (between the rear portion 25b of the upper arm 25 and the drive shaft 30 in a plan view), and are connected to the rear portion 26b of the corresponding lower arm 26.

The rear sections 21b of the support frames 21 rotatably support a stabilizer 33. Left and right portions of the stabilizer 33 are located between the rear portions 25b of the upper arms 25 and the rear portions 26b of the lower arms 26, and are connected to the rear portions 26b of the lower arms 26.

With the above configuration, the upper arms 25, the lower arms 26, the uprights 27, the suspension springs 31, the dampers 32, and other relevant members constitute a double wishbone type suspension structure.

The suspension springs 31 are connected to the lower arm 26 (suspension arms) and the support frames 21 (joints 24). The dampers 32 are connected to the lower arm 26 (suspension arms) and the support frames 21 (joints 24). The connecting areas (joints 24) in which the suspension springs 31 and the dampers 32 are connected to the support frames 21 are located at portions of the support frames 21 above the front-back sections 21c.

Configuration Related to Joint Between Lower Frame and Body Frame

Figure 8:
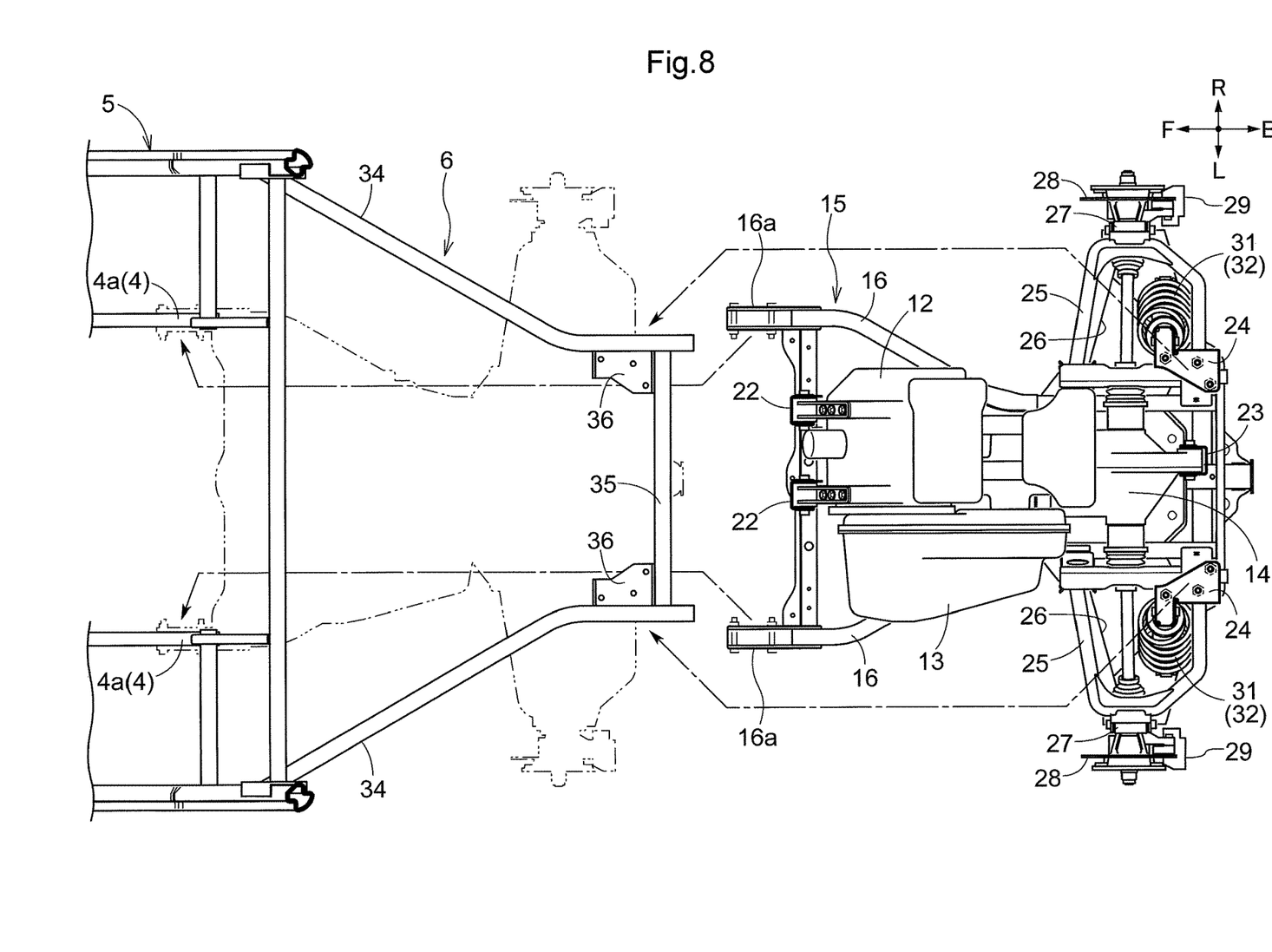
FIG. 8 is a plan view of the rear portion of the body frame, the lower frame, and the support frames with the engine, the continuously variable transmission, the transmission case, the suspension structure, and other members being supported by the lower frame and the support frames.
Figure 9:
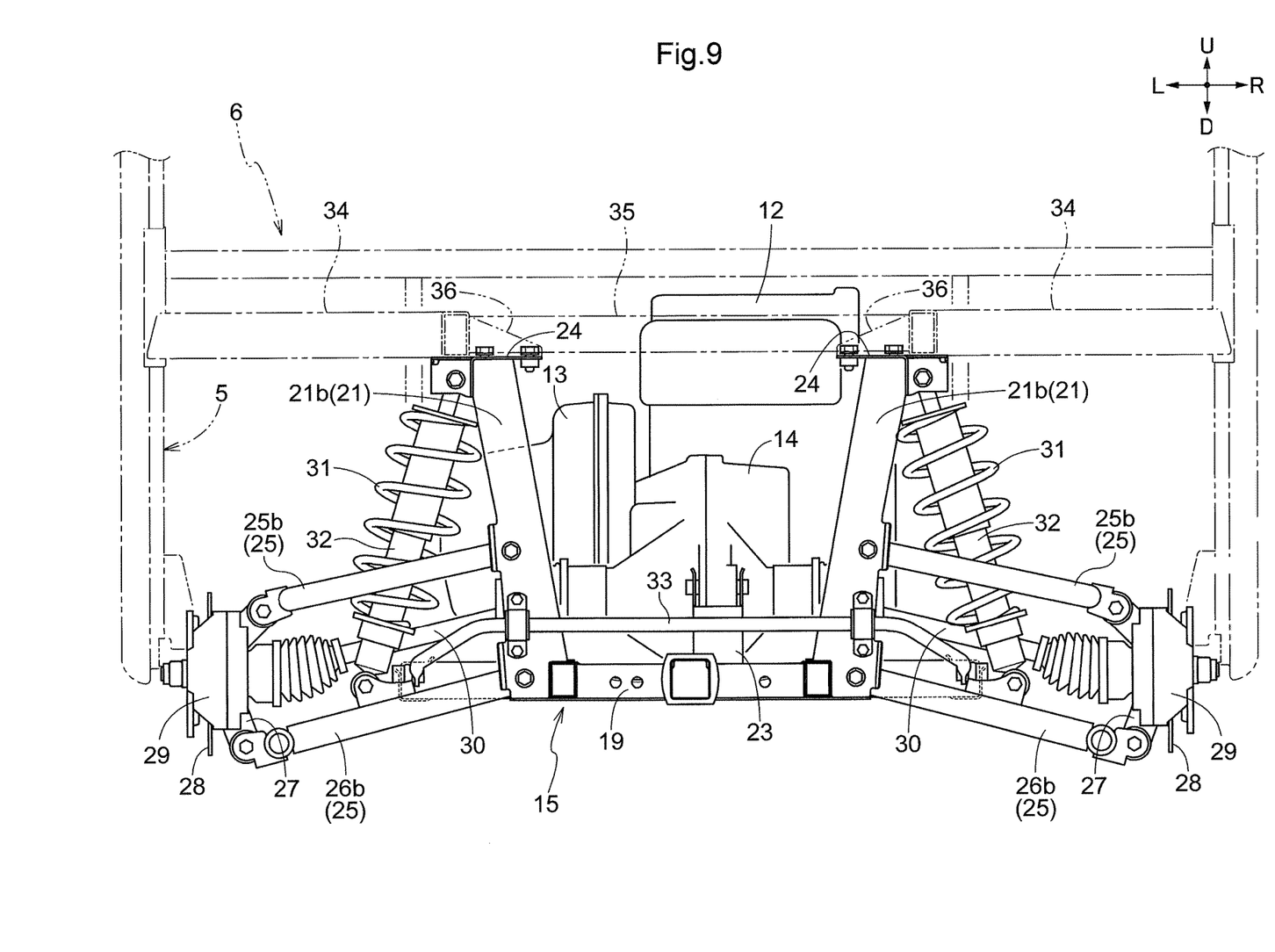
FIG. 9 is a back view of the rear portion of the body frame, the lower frame, and the support frames with the engine, the continuously variable transmission, the transmission case, the suspension structure, and other members being supported by the lower frame and the support frames.

Joints 4a are provided at rear left and right portions of the floor frame 4, as shown in FIGS. 6, 8, and 9.

The rear frame 6 has left and right front-back frames 34, a lateral frame 35, left and right joints 36, and other members. A front portion of the right front-back frame 34 is joined to a right portion of the ROPS frame 5, and the right front-back frame 34 extends obliquely backward and leftward. A front portion of the left front-back frame 34 is joined to a left portion of the ROPS frame 5, and the left front-back frame 34 extends obliquely backward and rightward.

The lateral frame 35 is joined to rear portions of the left and right front-back frames 34. The right joint 36, which is triangular in a plan view, is joined to a rear portion of the right front-back frame 34 and a right portion of the lateral frame 35. The left joint 36, which is triangular in a plan view, is joined to a rear portion of the left front-back frame 34 and a left portion of the lateral frame 35.

To join the lower frame 15 (support frames 21) to the body frame 3, the left and right joints 16a of the lower frame 15 (front-back frames 16) are joined to the left and right joints 4a of the floor frame 4. The left and right joints 24 of the lower frame 15 (support frames 21) are joined to the left and right joints 36 (left and right portions of the lateral frame 35) of the rear frame 6.

The above configuration enables the lower frame 15 (support frames 21) to be joined to the body frame 3. A front portion of the lower frame 15 is joined to a rear lower portion of the body frame 3 (rear portion of the floor frame 4), and the upper portions of the support frames 21 (joints 24) are joined to the lateral frame 35 of the body frame 3 (rear frame 6) that extends in the left-right direction.

First Variation of Embodiment of Invention

The engine 12 in FIGS. 1 to 9 may be supported by a front portion of the body frame 3, rather than being supported by the lower frame 15.

Second Variation of Embodiment of Invention

The front sections 21a of the support frames 21 may extend upward of the rear sections 21b of the support frames 21.

According to the above configuration, the front-back sections 21c of the support frames 21 may be joined to intermediate portions, in the up-down direction, of the front sections 21a of the support frames 21 and upper portions of the rear sections 21b, and the joints 24 may be joined to the upper portions of the front sections 21a of the support frames 21.

According to the above configuration, the front portions 25a of the upper arms 25 may be bent and protrude forward. With this, a configuration may be employed where the suspension springs 31 and the dampers 32 extend through a region between the front portions 25a and the rear portions 25b of the upper arms 25 and forward of the drive shafts 30 (between the front portions 25a of the upper arms 25 and the drive shafts 30 in a plan view), and are connected to the front portions 26a of the lower arms 26.

Third Variation of Embodiment of Invention

The front wheels 1 may also employ the configuration shown in FIGS. 2 to 9.

According to this configuration, the support frames 21 are joined to front left and right portions of the lower frame 15, and extend upward. The lower frame 15 supports a front-wheel differential case (not shown) (which corresponds to a transmission case) that contains a front-wheel differential device (not shown) (which corresponds to a transmission mechanism).

According to the above configuration, the lower frame 15 (support frames 21) are joined to the front portion of the body frame 3, a rear portion of the lower frame 15 is joined to a front lower portion of the body frame 3 (front portion of the floor frame 4), and the upper portions of the support frames 21 (joints 24) are joined to front portions of the ROPS frame 5.

Alternatively, the front-wheel differential case may be eliminated from the front wheels 1 in such a manner that motive power is not transferred to the front wheels 1. According to this configuration, the work vehicle is of a two-wheel drive type in which the rear wheels 2 are driven.

Fourth Variation of Embodiment of Invention

A configuration may be employed in which the lower frame 15 is joined to the floor frame 4, and the upper portions of the support frames 21 (joints 24) are not joined to the lateral frame 35 of the rear frame 6 (ROPS frame 5).

According to this configuration, the support rigidity of the support frames 21 can be ensured by joining a lateral frame (not shown) other than the lateral frame 35 of the rear frame 6 to the upper portions of the left and right support frames 21 (joints 24).

Fifth Variation of Embodiment of Invention

The suspension springs 31 and the dampers 32 may be connected to the upper arms 25 and the support frames 21.

According to this configuration, the front portions 25a of the upper arms 25 need not be bent and protrude forward, and the rear portions 25b of the upper arms 25 need not be bent and protrude backward.

Sixth Variation of Embodiment of Invention

The suspension structure may be of a strut type, rather than a double wishbone type.

The above configuration may be such that the suspension springs 31 and the dampers 32 are separate, rather than being configured to integrally expand and contract, the suspension springs 31 are connected to the suspension arms and the support frames 21, and the dampers 32 are connected to the suspension arms and the support frames 21.

INDUSTRIAL APPLICABILITY

The present invention is applicable to a suspension structure of a work vehicle.

DESCRIPTION OF REFERENCE SIGNS

1 Front wheel (wheel)
2 Rear wheel (wheel)
3 Body frame
14 Transmission case
15 Lower frame
21 Support frame
21a Front section
21b Rear section
21c Front-back section
24 Joint
25 Upper arm (suspension arm)
25a Front portion
5 25b Rear portion
26 Lower arm (suspension arm)
26a Front portion
26b Rear portion
27 Upright
10 30 Drive shaft
31 Suspension spring
32 Damper
35 Lateral frame

The invention claimed is:

1. A work vehicle comprising:
a lower frame;
left and right support frames joined respectively to a right portion and a left portion of the lower frame and extending upward;
left and right suspension arms supported by the support frames;
uprights supporting wheels and supported by the suspension arms;
left and right suspension springs connected to the suspension arms and the support frames; and
left and right dampers connected to the suspension arms and the support frames,
wherein the lower frame is joined to a body frame, and
wherein the support frames each comprise:
a front section supporting a front portion of a corresponding suspension arm of the suspension arms; and
a rear section supporting a rear portion of the corresponding suspension arm of the suspension arms,
wherein the front section has a top below a top of the rear section,
wherein the support frames are joined to a rear portion of the lower frame,
wherein the lower frame has a front portion joined to a rear lower portion of the body frame, and
wherein the support frames each have an upper portion joined to a lateral frame of the body frame, the lateral frame extending in a left-right direction.

2. The work vehicle according to claim 1,
wherein the support frames each have an upper portion joined to a lateral frame of the body frame, the lateral frame extending in a left-right direction.

3. The work vehicle according to claim 2,
wherein the upper portions of the support frames each have a joint joined to the lateral frame, and
wherein the suspension springs and the dampers are connected to the joints.

4. A work vehicle comprising:
a lower frame;
left and right support frames joined respectively to a right portion and a left portion of the lower frame and extending upward;
left and right suspension arms supported by the support frame;
uprights supporting wheels and supported by the suspension arms;
left and right suspension springs connected to the suspension arms and the support frames; and
left and right dampers connected to the suspension arms and the support frames,
wherein the lower frame is joined to a body frame,
wherein the support frames each comprise:
a front section supporting a front portion of a corresponding suspension arm, of the suspension arms;
a rear section supporting a rear portion of the corresponding suspension arm, of the suspension arms; and
a front-back section joined to the front section and the rear section, and
wherein the support frames comprise connecting areas in which the suspension springs and the dampers are connected to the support frames, the connecting areas located above the front-back sections of the support frames.

5. The work vehicle according to claim 4, further comprising:
a transmission case supported by the lower frame; and
left and right drive shafts supported by the uprights and extending leftward and rightward, respectively, from the transmission case through regions surrounded by the lower frame, the front sections, the rear sections, and the front-back sections, and
wherein the transmission case comprises a transmission mechanism configured to receive motive power and transfer the motive power to the wheels via the drive shafts.

6. The work vehicle according to claim 5,
wherein the suspension arms comprise upper arms and lower arms, and
wherein each of the upper arms has a front portion and a rear portion, and (i) the front portion is bent to protrude forward or (ii) the rear portion is bent to protrude rearward, in such a manner that a corresponding one of the left and right suspension springs and a corresponding one of the left and right dampers extend through a region between the front portion and the rear portion at a position forward or rearward of a corresponding one of the left and right drive shafts, and are connected to a corresponding one of the lower arms.

7. A work vehicle comprising:
a lower frame;
left and right support frames joined respectively to a right portion and a left portion of the lower frame and extending upward;
left and right suspension arms supported by the support frames;
uprights supporting wheels and supported by the suspension arms;
left and right suspension springs connected to the suspension arms and the support frames; and
left and right dampers connected to the suspension arms and the support frames,
wherein the lower frame is joined to a body frame, and
wherein the work vehicle further comprises a front-back section that connects a top of a first portion of one of the support frames to a heightwise midpoint of a second portion of the one of the left and right support frames.

* * * * *